United States Patent [19]

Deng

[11] Patent Number: 5,632,403
[45] Date of Patent: May 27, 1997

[54] PRESSURE COOKER

[76] Inventor: Chih-Chiang Deng, No. 86, Lane 267, Section 3, Jien Guo Road, Fong San City, Kaoshiung Hsien, Taiwan

[21] Appl. No.: 420,733

[22] Filed: Apr. 11, 1995

[51] Int. Cl.⁶ ............................................. B65D 90/04
[52] U.S. Cl. ............... 220/421; 220/203.07; 220/203.1; 220/203.23; 220/259; 220/740; 99/337; 99/340
[58] Field of Search .................. 220/203.04, 203.07, 220/203.1, 203.23, 203.29, 23.86, 912, 408, 412, 421, 422, 444, 466, 259, 737, 739, 740, 324, 326, 262, 263, 264; 215/270, 262, 352; 99/337, 340, 403; 126/369, 375, 376, 377, 390; 292/41, 42

[56] References Cited

U.S. PATENT DOCUMENTS

| | | | |
|---|---|---|---|
| 1,752,584 | 4/1930 | Biette | 220/203.29 X |
| 1,923,503 | 8/1933 | Raines | 220/203.04 |
| 2,907,196 | 10/1959 | Duttine | 292/42 X |
| 3,025,692 | 3/1962 | Cheney | 292/42 X |
| 4,179,039 | 12/1979 | Kawolics | 220/740 X |
| 4,962,800 | 10/1990 | Owiriwo | 292/42 X |
| 4,969,573 | 11/1990 | Dupuis et al. | 220/259 |
| 5,056,678 | 10/1991 | Grills et al. | 220/259 X |
| 5,092,229 | 3/1992 | Chen | 220/203.04 X |
| 5,251,542 | 10/1993 | Itoh et al. | 220/912 X |
| 5,355,777 | 10/1994 | Chen et al. | 220/912 X |

FOREIGN PATENT DOCUMENTS 354926  7/1935  Germany .................. 215/352

Primary Examiner—Jes F. Pascua
Assistant Examiner—Nathan Newhouse
Attorney, Agent, or Firm—Morton J. Rosenberg; David I. Klein

[57] ABSTRACT

A pressure cooker includes a container having an upper annular shoulder. A pot is engaged in the container and has an annular flange extended from the upper portion. A cap has a peripheral portion engaged with the annular flange of the pot. A cover is pivotally coupled to the container and may be locked to the container for enclosing the container. The container, the cap and the cover each includes a hollow space for engaging with heat insulating materials. A spring is engaged between the cap and the cover for biasing the cap to enclose the pot.

4 Claims, 4 Drawing Sheets

5,632,403

PRESSURE COOKER

BACKGROUND OF THE INVENTION

1. Field of the Invention

The present invention relates to a cooker, and more particularly to a pressure cooker.

2. Description of the Prior Art

Typical pressure cookers comprise a container and a pot disposed in the container. The container includes a cover secured on top thereof for enclosing the pot therein. The pot containing food is cooked and heated an oven and is then disposed in the container which is enclosed by the cover. The food contained in the pot may generate steam which is kept in the container by the cover in order to form high pressure within the container so as to further pressurize or cook the food. However, normally, the pot is not covered such that the food may flow out of the pot and may pollute the interior of the container.

The present invention has arisen to mitigate and/or obviate the afore-described disadvantages of the conventional pressure cookers.

SUMMARY OF THE INVENTION

The primary objective of the present invention is to provide a pressure cooker which includes a pot suitably sealed such that the pot may include high pressure therein.

In accordance with one aspect of the invention, there is provided a pressure cooker comprising a container including a peripheral wall member and a bottom portion having a hollow space formed therein for engaging with heat insulating materials, the container including an upper surface and including an upper and inner portion having an annular shoulder formed therein, the container including an upper portion, a pot engaged in the container and including an upper portion having a first annular flange extended radially outward therefrom, a cap including a peripheral portion having a second annular flange extended radially outward therefrom for engaging with the first annular flange of the pot, the cap including a hollow interior formed therein for engaging with heat insulating materials, a cover pivotally coupled to the upper portion of the container and including a hollow room formed therein for engaging with heat insulating materials, means for securing the cover to the container so as to retain the pot in the container, and means for biasing the cap toward the pot so as to force the cap to enclose the pot.

Two sealing rings are engaged on the upper surface and the annular shoulder of the container respectively for engaging with the cover and for engaging with the first annular flange of the pot respectively, the sealing ring engaged on the upper surface of the container includes a first pressure releasing hole formed therein, a third sealing ring is engaged in the second annular flange of the cap for engaging with the first annular flange of the pot, and the first annular shoulder of the pot includes a second and a third pressure releasing holes formed therein for engaging with the second and the third sealing rings.

The container includes a casing secured to the upper portion, the securing means includes a catch secured to the cover, a pair of latches slidably engaged in the casing for engaging with and for catching the catch, and means for biasing the latches away from each other.

The biasing means includes a barrel secured on top of the cap, a spring engaged in the barrel and a slide engaged on the spring, the barrel includes a pair of retaining slots oppositely formed therein, the slide includes a pair of projections extended outward therefrom for engaging with the retaining slots of the barrel, the cover is engaged with the slide so as to force the spring in order to press the cap to enclose the pot.

The cap includes an upper and center portion having a cavity formed therein, and a bolt extended upward from the cavity for engaging with the barrel, the barrel is adjusted upward and downward relative to the bolt so as to adjust biasing force of the spring.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
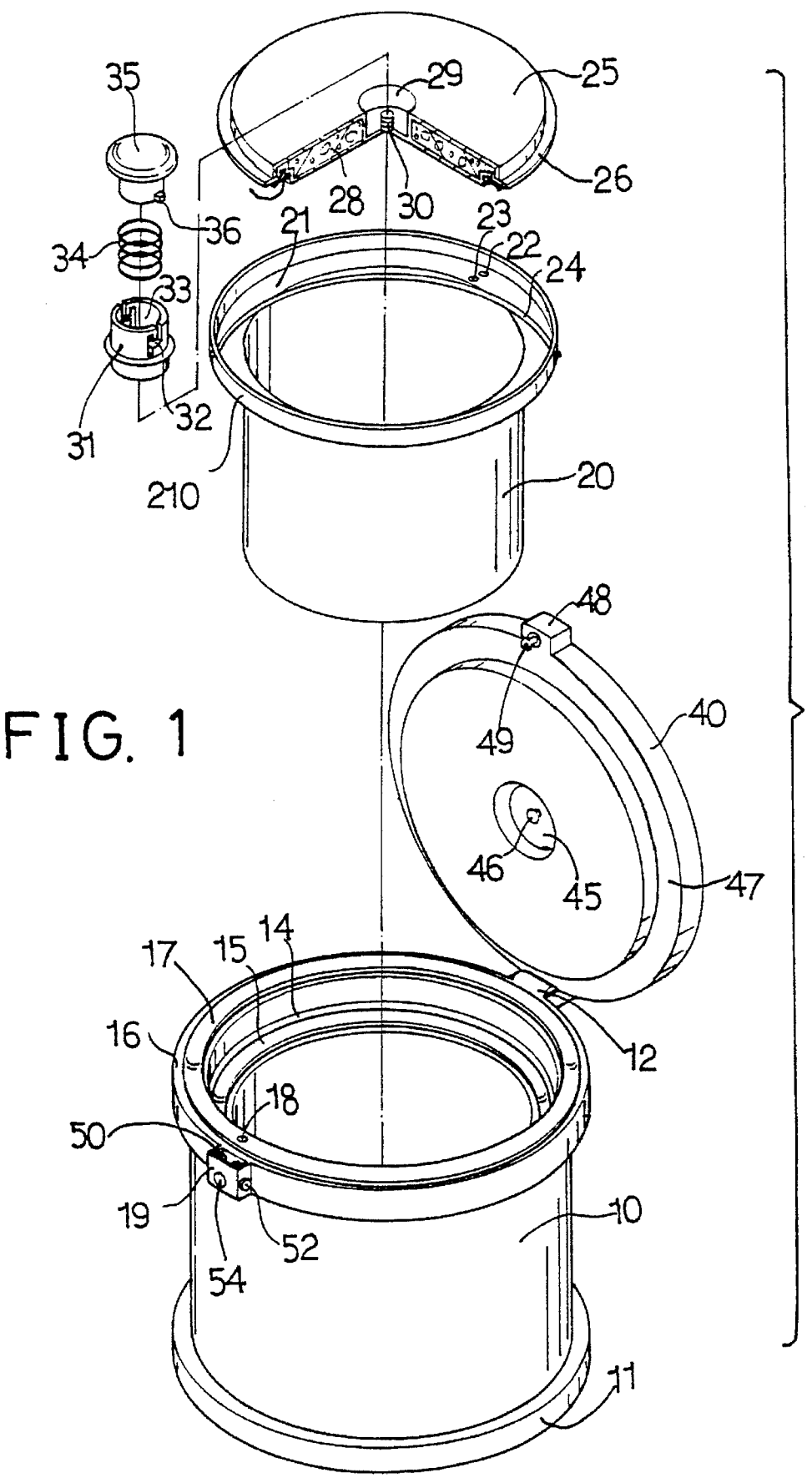
FIG. 1 is an exploded view of a pressure cooker in accordance with the present invention.
Figure 2:
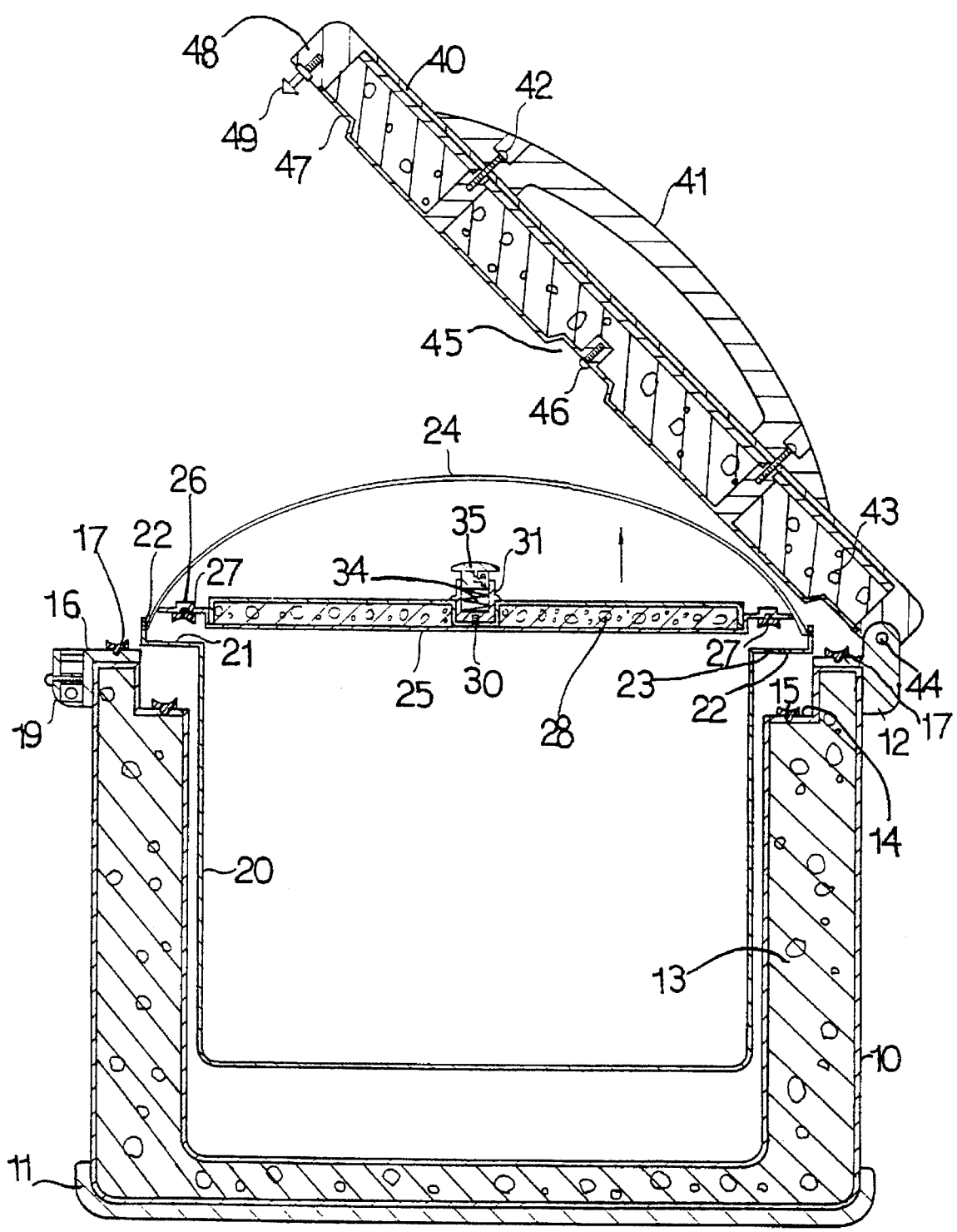
FIGS. 2 and 3 are cross sectional views of the pressure cooker.
Figure 3A:
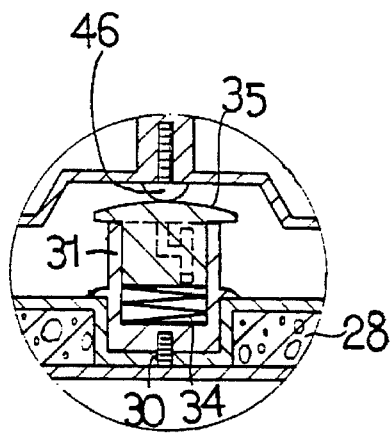
FIG. 3A is an enlarged partial cross sectional view of the pressure cooker.
Figure 3:
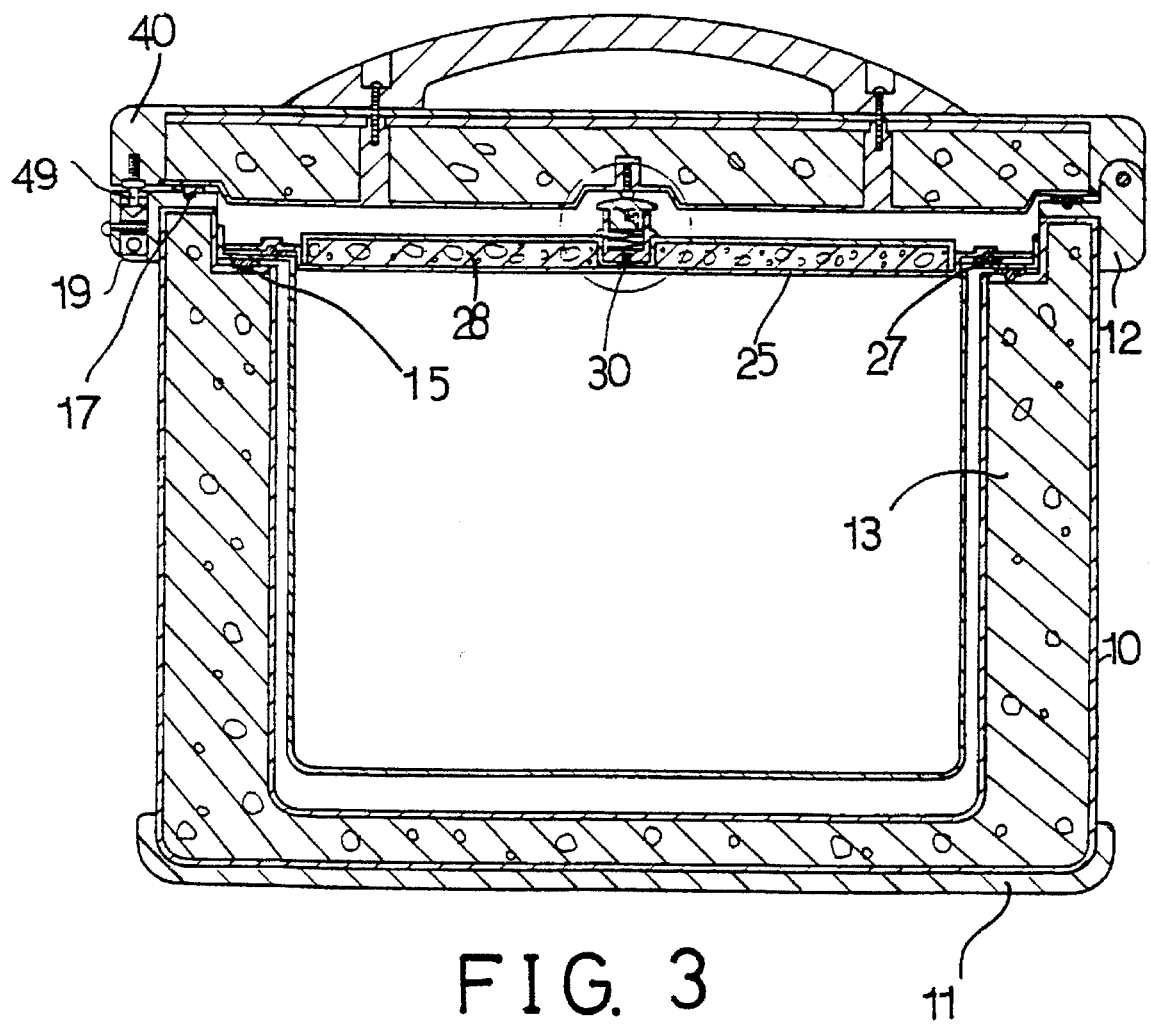

Referring to the drawings, and initially to FIGS. 1 to 3, a pressure cooker in accordance with the present invention comprises a container 10 including a base portion 11 and including a lug 12 provided on the outer peripheral portion. The container 10 includes a hollow space 13 formed in the peripheral wall and the bottom portion for receiving a heat insulating material therein, such as foamable material, cork etc., so as to form an excellent heat insulating configuration. The container 10 includes an annular shoulder 14 formed in the upper and inner portion thereof for engaging with a gasket or sealing ring 15, and includes an upper circular surface 16 for engaging with a gasket or sealing ring 17. The sealing ring 17 includes a pressure releasing hole 18 formed therein. The container 10 includes a casing 19 formed in the upper portion opposite to the lug 12.

A pot 20 is engaged in the container and includes an annular flange 21 laterally extended outward from the upper portion for engaging with the sealing ring 15 of the annular shoulder 14, and includes a peripheral rib 210 extended upward from the outer peripheral portion of the annular flange 21. The annular flange 21 includes a pressure releasing hole 22 for engaging with the sealing ring 15 and includes another pressure releasing hole 23. A handle 24 is pivotally coupled to the peripheral rib 210 for carrying the pot 20. A cap 25 is engaged on the pot 20 and includes an annular flange 26 for engaging with the annular flange 21 of the pot 20 and having a sealing ring 27 engaged in the annular flange 26 for engaging with the annular flange 21 and for engaging with the pressure releasing hole 23. The cap 25 also includes a hollow interior 28 for receiving heat insulating materials therein, and includes a cavity 29 formed in the upper and center portion thereof and having a bolt 30 extended upward therein for securing a barrel 31 therein. The barrel 31 includes a pair of retaining slots 32 oppositely formed therein and includes a bore 33 for receiving a slide 35 which includes a pair of projections 36 laterally extended outward therefrom for engaging with the retaining slots 32 of the barrel 31 so as to be secured to the barrel 31. A spring 34 is engaged between the barrel 31 and the slide 35 for biasing the slide 35 upward away from the barrel 31.

A cover 40 is pivotally coupled to the lug 12 of the container 10 at a pivot axle 44 and includes a hand grip 41 secured thereto by screw members 42. The cover 40 includes a hollow room 43 for receiving heat insulating materials therein, and includes a recess 45 formed in the lower and center portion thereof and having a bolt 46 secured therein for engaging with the slide 35 and for forcing the slide 35 downward and inward of the barrel 31 when the cover 40 is engaged onto the container 10, best shown in FIG. 3A. The cap 25 may be forced against the pot 20 by the cover 40 and the spring 34. The barrel 31 may be adjusted outward of inward of the cavity 29 by the bolt 30 so as to adjust the biasing force of the spring 34. The cover 40 includes a peripheral surface 47 for engaging with the sealing ring 17 and includes a block 48 extended therefrom opposite to the pivot axle 44 and having a catch 49 extended therefrom for engaging inwards of the casing 19. The pressure releasing holes 18, 22, 23 of the sealing ring 17 and of the annular flange 21 facilitating the disengagements of the pot 20 from the container 10, of the cap 25 from the pot 20, and of the cover 40 from the container 10.

Figure 4:
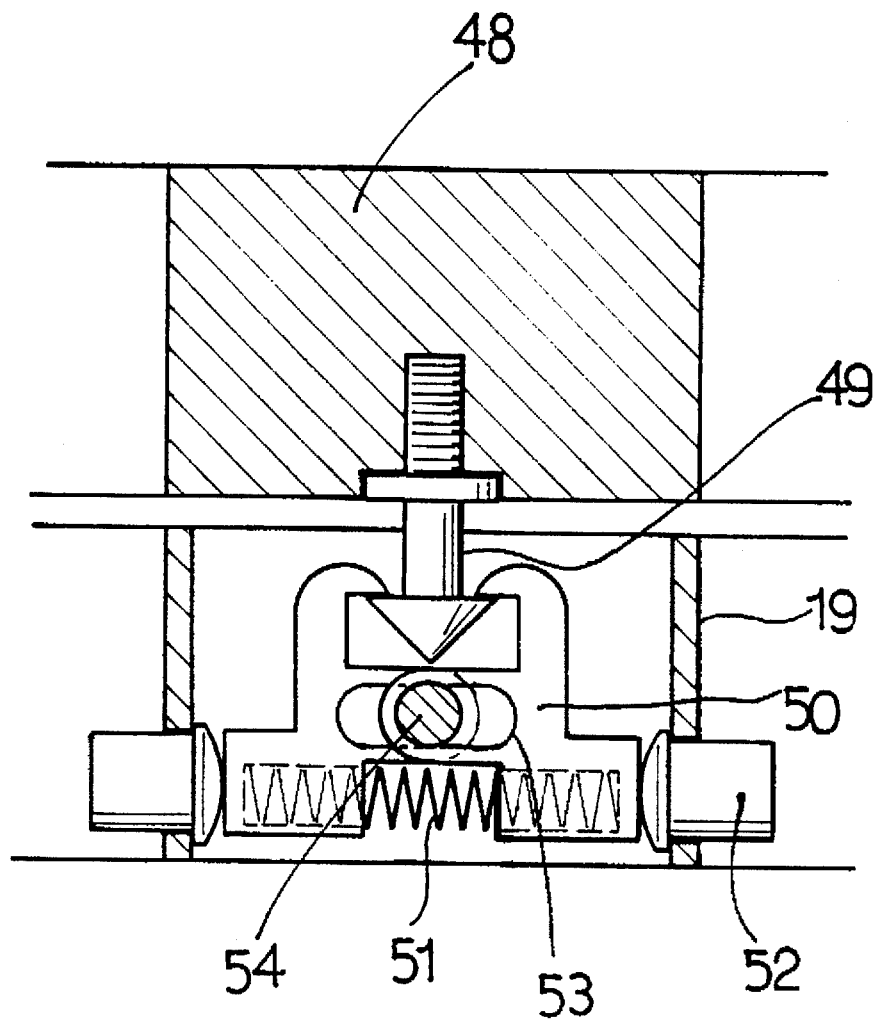
FIG. 4 is a partial cross sectional view showing the latching mechanism.

Referring next to FIG. 4, the casing 19 includes a pair of latches 50 slidably engaged therein, a spring 51 for biasing the latches 50 away from each other, and a pair of knobs 52 engaged with the latches 50 and biased outward of the casing 19 by the spring 51. The latches 50 each includes an oblong hole 53 formed therein for slidably engaging on a shaft 54. The catch 49 may separate the latches 50 away from each other against the spring 51 and may be retained in place by the latches 50 such that the cover 40 may be secured to the container 10. The catch 49 may be disengaged from the latches 50 when the latches 50 are moved toward each other by the knobs 52.

Accordingly, the pressure cooker in accordance with the present invention includes a inner cap that may be solidly secured to the pot for suitably enclosing the pot so as to prevent the food contained therein from moving out of the pot.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pressure cooker comprising:

a container including a peripheral wall member and a bottom portion having a hollow space formed therein for engaging with heat insulating materials, said container including an upper surface and including an upper and inner portion having an annular shoulder formed therein, a pot engaged in said container and including an upper portion having a first annular flange extended radially outward therefrom, a cap including a peripheral portion having a second annular flange extended radially outward therefrom for engaging with said first annular flange of said pot, said cap including a hollow interior formed therein for engaging with heat insulating materials, a cover pivotally coupled to said upper portion of said container and including a hollow room formed therein for engaging with heat insulating materials, means for securing said cover to said container so as to retain said pot in said container, and means for biasing said cap toward said pot so as to force said cap to enclose said pot, said biasing means including a barrel secured on top of said cap, a spring engaged in said barrel and a slide engaged on the spring, said barrel including a pair of retaining slots oppositely formed therein, said slide including a pair of protections extended outward therefrom for engaging with said retaining slots of said barrel, said cover being engaged with said slide so as to force said spring in order to press said cap to enclose said pot.

2. A pressure cooker according to claim 1 further comprising a first and a second sealing rings engaged on said upper surface and said annular shoulder of said container respectively for engaging with said cover and for engaging with said first annular flange of said pot respectively, said first sealing ring including a first pressure releasing hole formed therein, a third sealing ring engaged in said second annular flange of said cap for engaging with said first annular flange of said pot, and said first annular shoulder of said pot including a second and a third pressure releasing holes formed therein for engaging with said second and said third sealing rings.

3. A pressure cooker according to claim 1, wherein said container includes a casing secured to said upper portion, said securing means includes a catch secured to said cover, a pair of latches slidably engaged in said casing for engaging with and for catching said catch, and means for biasing said latches away from each other.

4. A pressure cooker according to claim 1, wherein said cap includes an upper and center portion having a cavity formed therein, and a bolt extended upward from said cavity for engaging with said barrel, said barrel is adjusted upward and downward relative to said bolt so as to adjust biasing force of said spring.

* * * * *